United States Patent
Romdhane

(10) Patent No.: US 12,202,433 B2
(45) Date of Patent: Jan. 21, 2025

(54) CONTROL OF ACCESS TO A VEHICLE FUNCTION

(71) Applicant: Bayerische Motoren Werke Aktiengesellschaft, Munich (DE)

(72) Inventor: Taoufik Romdhane, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 62 days.

(21) Appl. No.: 17/924,727

(22) PCT Filed: Mar. 4, 2021

(86) PCT No.: PCT/EP2021/055455
§ 371 (c)(1),
(2) Date: Nov. 11, 2022

(87) PCT Pub. No.: WO2021/228451
PCT Pub. Date: Nov. 18, 2021

(65) Prior Publication Data
US 2023/0182683 A1    Jun. 15, 2023

(30) Foreign Application Priority Data

May 14, 2020    (DE) .................... 10 2020 113 152.6

(51) Int. Cl.
*B60R 25/24*    (2013.01)
*H04L 9/40*    (2022.01)

(52) U.S. Cl.
CPC .......... *B60R 25/24* (2013.01); *H04L 63/0823* (2013.01)

(58) Field of Classification Search
CPC ..... B60R 25/24; B60R 25/2045; B60R 25/23; H04L 63/0823; H04L 9/40
USPC ........................................ 340/5.51, 5.2, 5.71
See application file for complete search history.

(56) References Cited

U.S. PATENT DOCUMENTS

| | | | |
|---|---|---|---|
| 8,947,202 B2* | 2/2015 | Tucker ................. | B60R 16/037 340/5.72 |
| 9,858,737 B2* | 1/2018 | Davidsson .............. | E05B 49/00 |
| 10,217,304 B2* | 2/2019 | Chen .................. | G07C 9/00571 |
| 11,192,522 B2* | 12/2021 | Kim ....................... | B60R 25/00 |

(Continued)

FOREIGN PATENT DOCUMENTS

| DE | 10 2018 002 217 A1 | 3/2019 |
|---|---|---|
| DE | 10 2018 208 829 A1 | 12/2019 |

(Continued)

OTHER PUBLICATIONS

DE102018002217 translation; Smuda, peer, et al.; authorization system; pp. 1 to 10; see Figures 1 to 3. Mar. 19, 2018 (Year: 2018).*

(Continued)

*Primary Examiner* — Nam V Nguyen
(74) *Attorney, Agent, or Firm* — Crowell & Moring LLP

(57) ABSTRACT

A method for controlling the use of a pre-defined vehicle function of a vehicle includes capturing a graphical token; transmitting the token to the vehicle; transmitting the token to a person who should be authorized to use the vehicle function; capturing a graphical token presented at the vehicle; and unlocking the vehicle function if the presented token matches the transmitted token. The graphical token includes a manual graphical input of a person authorized to use the vehicle function.

8 Claims, 3 Drawing Sheets

(56) References Cited

U.S. PATENT DOCUMENTS

| | | | |
|---|---|---|---|
| 11,475,105 B2* | 10/2022 | Jakobsson | H04L 63/20 |
| 2010/0246798 A1 | 9/2010 | Ramamurthy | |
| 2014/0277837 A1* | 9/2014 | Hatton | H04L 63/0853 |
| | | | 701/2 |
| 2014/0281946 A1 | 9/2014 | Avni et al. | |
| 2016/0055699 A1* | 2/2016 | Vincenti | H04W 12/04 |
| | | | 340/5.61 |
| 2019/0028443 A1* | 1/2019 | Chin | B60R 25/24 |

FOREIGN PATENT DOCUMENTS

| | | |
|---|---|---|
| DE | 10 2018 126 981 A1 | 4/2020 |
| EP | 2 881 878 A2 | 6/2015 |
| WO | WO 2014/146186 A1 | 9/2014 |
| WO | WO 2019/241047 A1 | 12/2019 |

OTHER PUBLICATIONS

International Search Report (PCT/ISA/210) issued in PCT Application No. PCT/EP2021/055455 dated Jun. 22, 2021 with English translation (six (6) pages).

German-language Written Opinion (PCT/ISA/237) issued in PCT Application No. PCT/EP2021/055455 dated Jun. 22, 2021 (seven (7) pages).

German-language Search Report issued in German Application No. 10 2020 113 152.6 dated Feb. 9, 2021 with partial English translation (13 pages).

* cited by examiner

CONTROL OF ACCESS TO A VEHICLE FUNCTION

BACKGROUND AND SUMMARY OF THE INVENTION

The present invention relates to the control of access to a function of a vehicle. In particular, the invention relates to a transfer of an authorization to use the function.

A vehicle, in particular a motor vehicle, comprises a control device that is set up to control one or more vehicle functions. The vehicle function may, for example, relate to access to a vehicle door, in particular a luggage compartment door or loading compartment door. Sometimes it is also desired that a person gain access only to certain vehicle functions and not to other vehicle functions. For example, a mechanic may be allowed to open an engine cowling of the vehicle but not the luggage compartment. Conversely, another person may only have access to the luggage compartment but not be allowed to use a driving function.

To control access to the vehicle function, a person usually has to authenticate themself to the vehicle. In a simple embodiment, a special key can be provided for this purpose, which can be programmed and read electronically, for example, to enable only certain vehicle functions. However, providing or making such a key can be costly. In particular, a special tool, such as a programming device, may be required to make the key. A spontaneous transfer of an access authorization to the vehicle, for example by a driver or owner of the vehicle, cannot usually be provided.

Therefore, an object underlying the present invention is to provide an improved technique for access control to a vehicle function. This object is achieve by the claimed invention.

According to a first aspect of the present invention, a method for controlling the use of a predetermined vehicle function of a vehicle comprises steps of sensing a graphical token; transmitting the token to the vehicle; transmitting the token to a person to be authorized to use the vehicle function; sensing a graphical token presented at the vehicle; and enabling the vehicle function if the presented token matches the transmitted token. Here, the graphical token comprises a manual graphical input of a person authorized to use the vehicle function.

With the aid of the invention, authorization to use the vehicle function can be created and transferred in a simple manner and without the aid of special devices. An authorized person can spontaneously and with little effort grant another person a suitable authorization for access. In accordance with embodiments of the invention, it has been recognized that it is not necessary for the token to have a predetermined information content, but only that it be as unique as possible. Therefore, the authorized person can make any graphical input to create the token. Replicating such an input may be more difficult than replicating a recognizable piece of information such as a name string, and so misuse may be better prevented.

Preferably, it is determined that an entropy of the graphical input exceeds a predetermined threshold. The more random the inputs appear to be, the higher the entropy can be determined to be. For example, a recognizable graphical representation such as a geometric body may have a low entropy, while freely distributed points, strokes, or other curves may have a higher entropy. A measure of the determined entropy may be displayed during the input, and the input may not be accepted until the entropy is sufficiently high.

In another embodiment, entropy includes an aspect of the input that is not apparent from the graphical result. For example, an input velocity or a pressure applied to an input medium can be taken into account. In particular, such parameters can be considered in a time profile during the input. A specific gesture may also be predetermined, for example, simultaneous input with two fingers or styluses.

The graphical input can comprise a lettering and a further graphic; wherein the entropy of the further graphic exceeds the predetermined threshold. An entropy of the token, which may be significant for the security of the method, may be so great, while at the same time the token carries a personal touch or a signature of some sort. The lettering may be useful for identification or recognition of the token.

In yet another embodiment, the graphical input is determined to have a predetermined amount of information. The amount of information may be determined along with the entropy. In yet another embodiment, the amount of information may be considered to be sufficient when a predetermined level of coverage or processing of an available drawing area is achieved.

The token can be assigned a predetermined condition; wherein the vehicle function is enabled only if the condition is met. In particular, the condition may specify a period of time during which the vehicle function can be used, or a duration over which use is permitted. Another possible condition includes a location of the vehicle. Different conditions can be combined with each other.

The token may comprise an indication of the vehicle function that is recognizable by a human. For example, the indication may comprise a text or a symbol. In further embodiments, a condition, an identification of the issuing person, the person using the vehicle function, or the vehicle may also be indicated. This information may be useful for managing a plurality of tokens. A token that has lost its validity, for example due to expiration of a predetermined time window, can be easily identified and discarded.

In yet another embodiment, the token comprises a predetermined background image. The background image may, for example, be captured by a camera and show a person or an object. An information content of the token can be increased thereby. It is generally preferred that the token is personally handed over by the authorized person to the person to be authorized. The background image can, for example, show both people or an object present when both people meet.

In yet another embodiment, the token is assigned an identifier; the identifier is transmitted to the person to be authorized; and the vehicle function is enabled only after the identifier is input. In this case, media via which the token and the identifier are transmitted to the person to be authorized are different from each other.

It is generally preferred that the token is provided and sent by a mobile device, in particular a smartphone. For example, the token can be transmitted in the form of an e-mail or other electronic message to both the person to be authorized and the vehicle. For example, the identifier may be transmitted visually or acoustically to the person to be authorized and may comprise, for example, a sequence of numbers or digits. This can allow two-factor authentication of the person to be authorized with respect to the vehicle. The identifier can be transmitted in encrypted form to the vehicle. Alternatively, the identifier may be converted and transmitted to the vehicle using a cryptographic hash function. The hash function may be known and, on the part of the vehicle, an appropriate conversion may be applied to a locally acquired input. Only if the results of the two hash functions match each other does the input made correspond to the predetermined input.

According to another aspect of the present invention, a first control device for a vehicle comprises an optical sensor set up to sense a graphical token presented at the vehicle; a wireless receiver for receiving a graphical token; and a processor set up to enable a predetermined vehicle function of the vehicle if the presented token matches the received token.

The first control device and, in particular, the processor may be set up to partially or fully execute a method described herein. For this purpose, the processor may comprise a programmable microcomputer or microcontroller. The method may be provided partially or fully in the form of a computer program product having program code. The computer program product may be stored on a computer-readable medium. Features or advantages of the method may be transferred to the device, and vice versa.

According to yet another aspect of the present invention, a vehicle comprises a first control device described herein.

A second control device comprises an identification device for identifying a person authorized to use a predetermined vehicle function of a predetermined vehicle; a sensing device for sensing a manual graphical input of the person; a processor for providing a graphical token comprising the graphical input; and a communication device for transmitting the token to a control device of the vehicle and to another person to whom the vehicle function is to be released.

In particular, the control device can be used to carry out part of a method described herein. Features or advantages of the method can also be transferred to the second control device, and vice versa. It is particularly preferred that the second control device comprises a personal communication device, such as in particular a smartphone, which is preferably associated with the person already authorized. The person to be authorized can receive the token by way of another smartphone and present it to the vehicle.

According to yet another aspect of the present invention, a system comprises a first and second control device described herein.

The invention will now be described in greater detail with reference to the accompanying drawings.

DETAILED DESCRIPTION OF THE DRAWINGS

Figure 1:
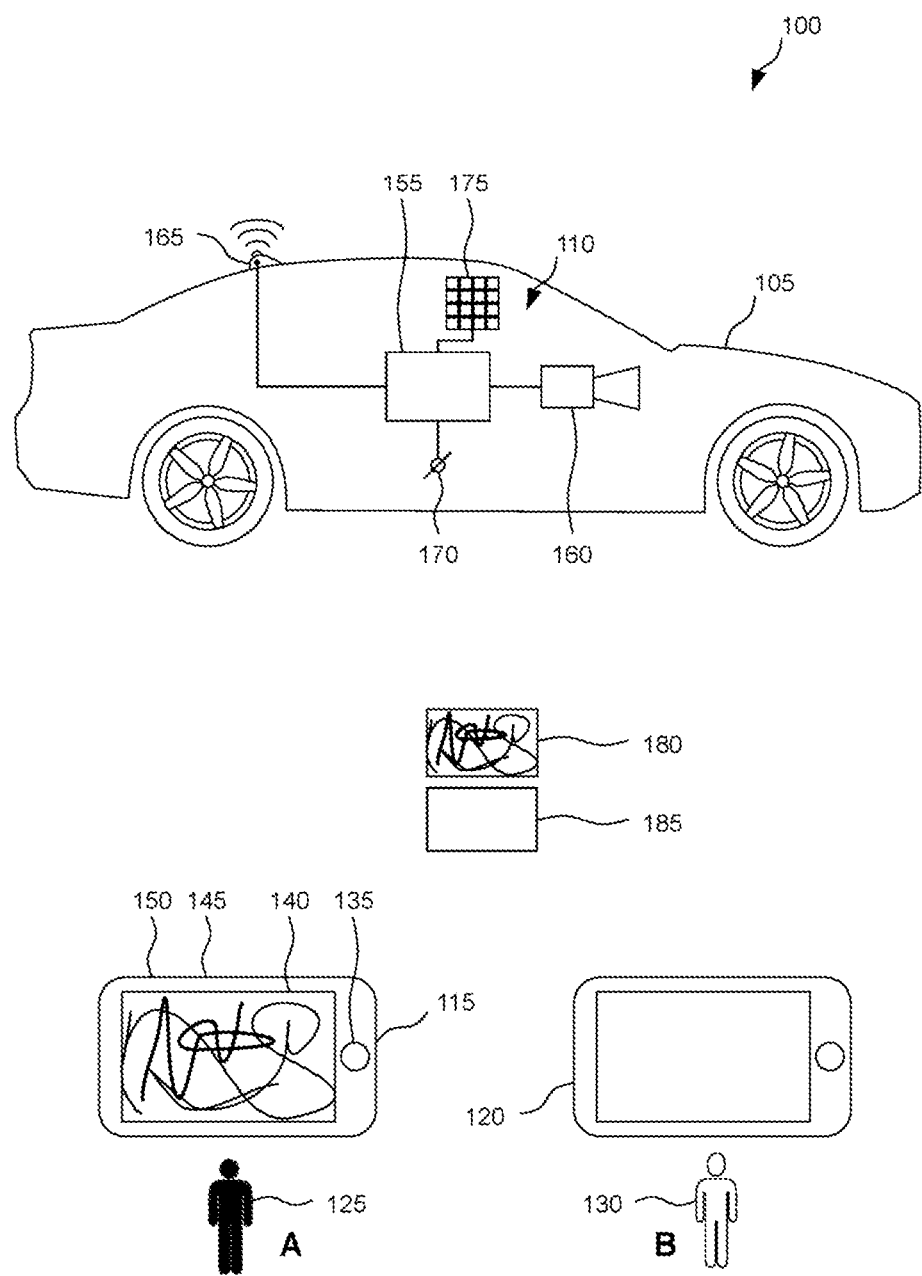
FIG. 1 illustrates a system.

FIG. 1 shows a system 100 for controlling access to a vehicle function of a vehicle 105. The system 100 comprises a first device 110 mounted on board the vehicle 105, a second device 115 independent of the vehicle 105, and an optional third device 120 independent of the other two devices 110, 115. The second device 115 is associated with a person 125 who is authorized to use the vehicle 105 or to transfer an authorization to use the vehicle 105 or a vehicle function, and who will be referred to as person A hereinafter. The third device 120 is further preferably associated with a person 130 who is to be authorized to use a predetermined vehicle function of the vehicle 105, and who is hereinafter referred to as person B. The devices 115 and 120 may each be formed by a personal communication device that may be preferably associated with a corresponding person 125, 130. In particular, the devices 115, 120 may each be formed by a smartphone or by a corresponding device.

In particular, the second device 115 may comprise an identification device 135 for identifying the person 125 (A), sensing device 140 for sensing a manual graphical input, a processor 145, and a communication device 150. The identification device 135 may comprise, for example, a sensor for scanning a fingerprint or facial shape of a user. In a first embodiment, the sensing device 140 comprises a camera for scanning, for example, a graphical representation on a piece of paper, and in a second embodiment, an input device, in particular a touch-sensitive surface on which, for example, writing or drawing can be performed using a finger or a stylus. The second device 115 preferably comprises a smartphone or tablet computer. The third device 120 may be constructed similarly to the second device 115.

The first device 110 on board the vehicle 105 comprises a processor 155 connected to a sensing device 160, a communication device 165, and an interface 170. Optionally, an input device 175 is provided. In particular, the sensing device 160 may comprise a camera and is set up to optically scan a graphical token presented to it in the region of the vehicle 105.

The sensing device 160 may comprise part of the vehicle 105 or one of its systems, such as an interior or exterior sensing system. The interface 170 is connected for connection to a control device on board the vehicle 105, wherein the control device is set up to perform, enable, or disable a predetermined vehicle function. For example, the control device may comprise a central locking system that may be controlled via the interface 170 to unlock or lock one or more doors of the vehicle 105. Other possible vehicle functions include a driving function, a use of a prime mover, optionally within predetermined limits, or the use of an entertainment system on board the vehicle 105.

The input device 175 is preferably set up to detect a manual input from a person. For this purpose, the input device 175 may be haptically or otherwise operable by the person. In yet another embodiment, the input device 175 may support an optical scanning of a text presented to the sensing device 160, wherein the text may be automatically recognized and converted into a corresponding string of characters.

It is proposed that the second device 115 may be used by the person 125 (A) to provide a graphical token 180 that they may communicate to the person 130 (B) and the vehicle 105 or the first device 110. The person 130 (B) is thereby granted the option to present the token 180 to the vehicle 105 and use a predetermined vehicle function associated with the token 180. In this regard, the graphical token 180 may be assigned other information 185 that may be advantageous for controlling authorization or for managing the token 180.

In particular, it is preferred that the person 125 (A) creates the graphical token 180 using a high-entropy manual input, for example in the form of one or more randomly appearing lines or dots. In one embodiment, the person may generate the token 180 using, for example, paper and a stylus and may scan it using a camera of the second device 115 to send it to the first device 110. The person 130 (B) may then present this paper in person at the vehicle 105. In another embodiment, the person 125 (A) creates the token 180 using the input device 175 of the second device 115. The person 130 (B) may then photograph the graphical token 180 using the third device 120 or receive it as an electronic message from the second device 115. Other transmission methods are also possible.

Several precautions can be taken to prevent an unauthorized person from sending a graphical token 180 to the first device 110 on board the vehicle 105. For example, generation of the graphical token 180 may require identification of the person 125 (A) to the second device 115. The token 180 may be transmitted to the first device 110 in encrypted form, provided with a digital signature or as a hash. A token 180 can be accepted by the device 110 only from an authorized source. Furthermore, in order to use the vehicle function, additional information may be required, which may be transferred from the person 125 (A) to the person 130 (B) via another medium. In particular, this information may comprise a predetermined input, in particular a string of digits or characters that may be associated with the token 180. The additional information can be presented to the person 130 (B) by the person 125 (A), in particular personally, for example acoustically. The vehicle function can only be enabled if both the input and the token 180 can be presented correctly.

Figure 2:
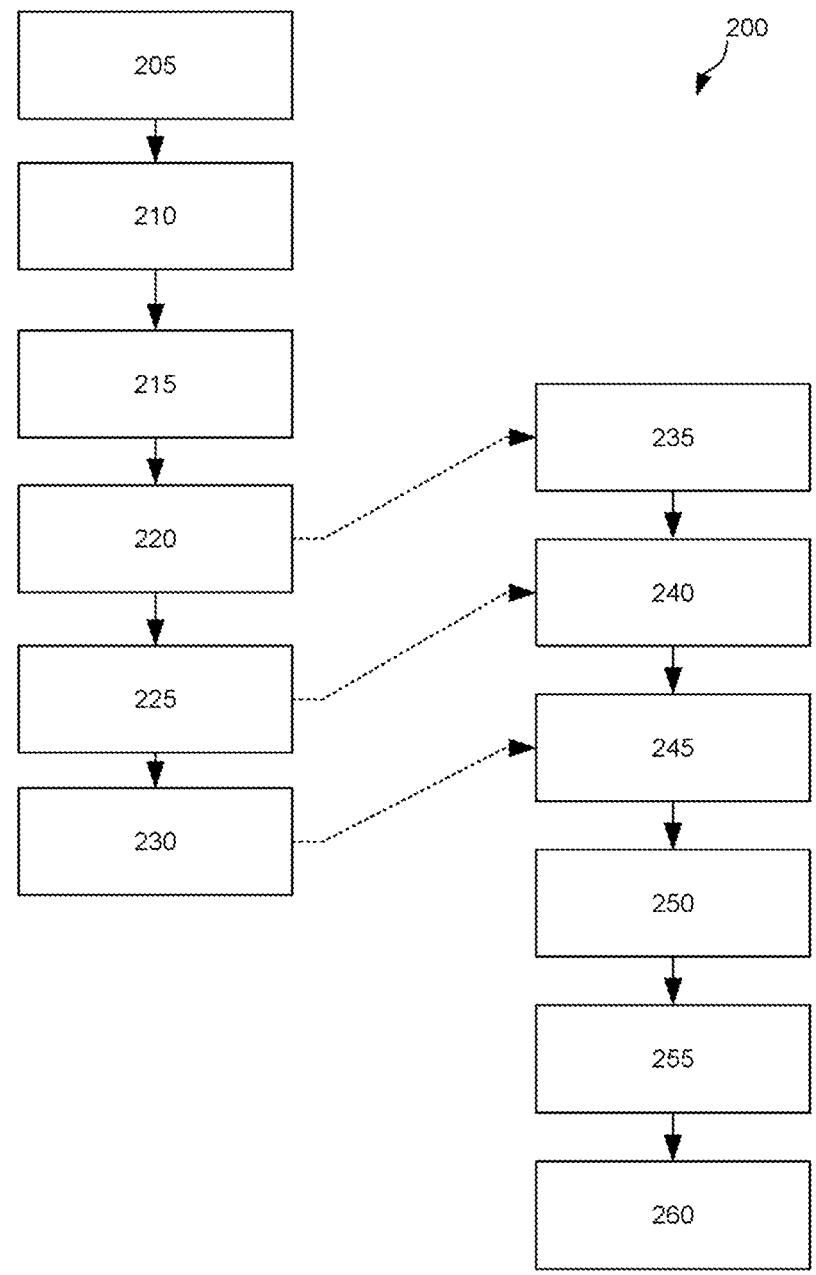
FIG. 2 illustrates a flow chart of a method.

FIG. 2 shows a flow chart of a method 200 for controlling the use of a predetermined vehicle function of a vehicle 105. Steps shown in a left region of the representation may be performed in particular on the part of the second device 115; steps shown on the right may be performed on the part of the first device 110 on board the vehicle 105.

In a step 205, the person 125 (A) may be authenticated to the second device 115, for example by providing a password or PIN or by sensing of a biometric feature. In a step 210, one or more inputs from the person 125 (A) may be captured. In particular, the inputs may include an identification of the vehicle 105, the vehicle function, a condition to be met to enable the vehicle function, or a predetermined identifier to be entered at the vehicle 105.

In addition, a manual graphical input from the person 125 (A) may be sensed. It is preferred that this input has a high entropy. For this purpose, the input can in particular be composed of dots, dashes or other graphical elements that are as erratic or seemingly random as possible, which are provided by the person 125 (A). In a particularly preferred embodiment, the entropy of an input that has already been made can be continuously determined and displayed to the person 125 (A). The input may be accepted only when a predetermined entropy is reached. Further requirements may also be placed on the input. For example, the input can only be accepted if it has a predetermined scope, so that a predetermined information content has been reached.

In a step 215, a graphical token 180 may be created. In particular, the token 180 may comprise a graphical representation of the manual graphical input. In addition, the token 180 may comprise further information, for example one of the further inputs of the person 125 (A) of step 210. Components of the token 180 that are to be secured against falsification or copying may be secured using cryptographic methods.

In a step 220, the token 180 may be sent to the vehicle 105 or the first device 110. In a step 225, the token 180 may be made available to the person 130 (B). In steps 220 and 225, the token 180 may be in different forms. For example, the token 180 transmitted to the vehicle 105 may be in digital form, such as a file. The token 180 may be transmitted to the person 130 (B) in particular graphically.

In addition, in an optional step 230, a predetermined identifier, which may have been determined in step 210, may be transmitted to the person 130 (B). A different transmission medium may be selected than the one used for the transmission of the token 180.

Outside the method 200, the person 130 (B) can now go to the vehicle 105 to use the vehicle function. On the part of the first device 110 on board the vehicle 105, a token 180 previously sent to the vehicle 105 by the second device 115 in step 220 may be received in a step 235. In a step 240, a graphical token 180 presented in the region of the vehicle 105 may be detected. In particular, the detected token 180 may comprise the token 180 made available to the person 130 (B). In a step 245, an input may be detected, which may in particular correspond to the identifier made available to the person 130 (B) in the step 230.

In a step 250, the sampled token 180 may be compared with the received token 180. In addition, the input can be compared to the received token. If any of the comparisons fail, an enablement of the vehicle function may be denied.

Otherwise, a predetermined condition received as part of or in addition to the token 180 in step 235 may be checked in a step 255. In particular, the condition may include a time period or a location. If the condition cannot be met, the enablement of the vehicle function may be denied. If all predetermined conditions are met, the vehicle function may be enabled in a step 260. A message regarding the release of the vehicle function may be transmitted to the person 125 (A) or the second device 115 associated with said person.

Figure 3:
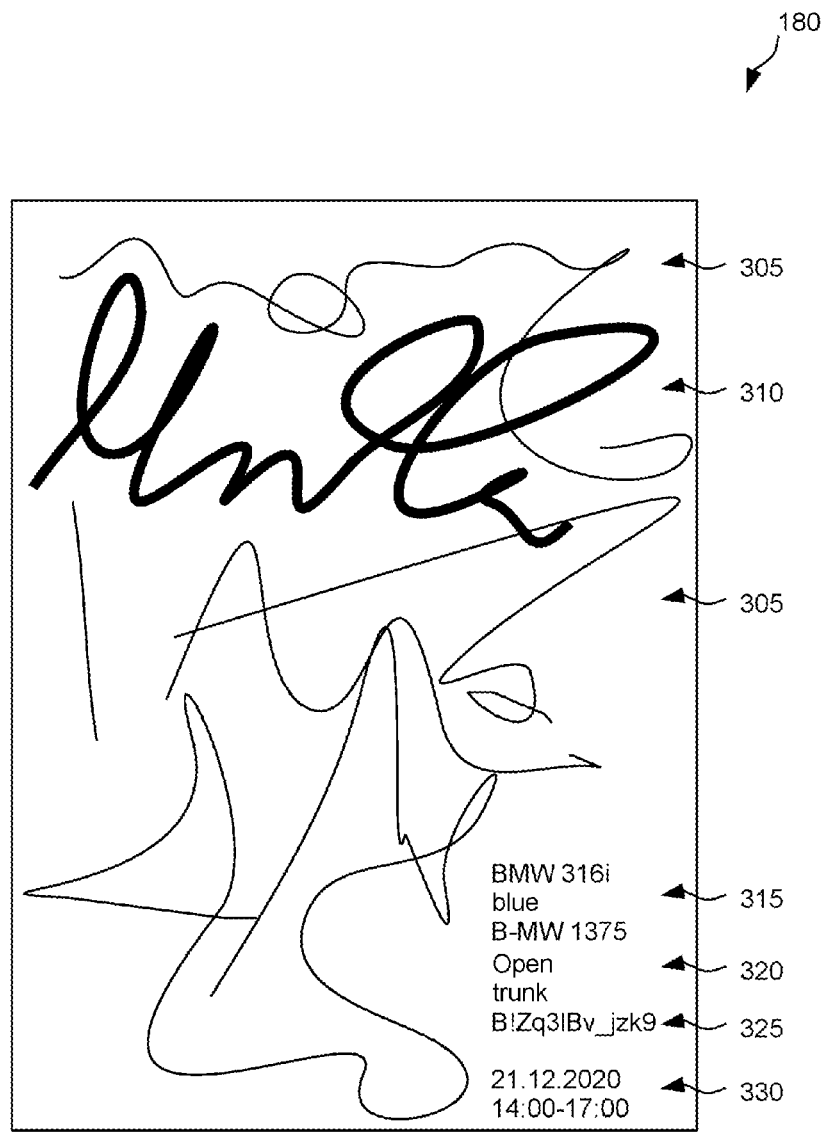
FIG. 3 illustrates an exemplary graphical token.

FIG. 3 shows an exemplary graphical token 180. In the example shown, in addition to graphical information, further information 185 is also inserted into the graphic as graphics or text. In another embodiment, this information can also be transmitted separately from the actual graphic.

The token 180 preferably comprises a number of graphical elements 305 which are as random as possible, each of which may comprise a line, a dot, or an area. In particular, the graphical elements 305 may be handwritten or drawn by the person 125 (A). It is particularly preferred that an entropy of the graphical elements 305 is as high as possible. To this end, graphical elements that carry a recognizable meaning may be ignored. For example, a lettering 310 may be shown, which may be added in the manner of a signature. The lettering 310 may indeed carry information, but its entropy is typically relatively low. In other words, it may be easier to mimic a lettering 310 than an at least seemingly random collection of graphical elements 305.

In terms of further information, an identification 315 of the vehicle 105 is provided as an example. The identification 315 may comprise, for example, a manufacturer, a type, a vehicle color or a registration number. Furthermore, a specification 320 of the vehicle function to be released may be provided. The vehicle function may be expressed, for example, textually or by way of a symbol. Optionally, a predetermined restriction of the vehicle function may also be indicated or represented. For example, if the vehicle function includes starting a prime mover in order to service the vehicle 105, it may be indicated here that moving the vehicle 105 by way of the prime mover should not occur or should occur only at a predetermined maximum speed.

A hash 325 may carry information that is not to be transmitted in plain text. For example, the hash 325 may include an identifier that must be presented in plain text along with the graphical token 180 to enable the vehicle function. The hash 325 may also include a digital signature and cryptographically secure the remaining content of the graphical token 180, particularly the random graphical elements 305. A time specification 330 may indicate when the token 180 was issued or when it may be used. In particular, the time specification 330 may comprise a predetermined period of time. Once this time period has elapsed, the token 180 may expire and the vehicle function may no longer be enabled on the basis of the token 180.

REFERENCE SIGNS 100 system
105 vehicle
110 first device
115 second device (person A)
120 third device (person B)
125 person A (authorized person)
130 person B (person to be authorized)
135 identification device
140 sensing device
145 processor
150 communication device
155 processor
160 sensing device
165 communication device
170 interface
175 input device
180 token
185 information
200 method
205 authenticate user
210 sense input
215 create token
220 send token to vehicle
225 send token to person
230 provide identifier to person
235 receive token
240 scan token
245 sense input
250 check token and input
255 check condition
260 enable vehicle function
305 random graphical element
310 lettering
315 identification
320 specification of vehicle function
325 hash
330 time specification

The invention claimed is:

1. A method for controlling a use of a predetermined vehicle function of a vehicle, the method comprising:

sensing a first graphical token, wherein the first graphical token comprises a manual graphical input of a second person authorized to use the vehicle function;

transmitting the first graphical token to the vehicle;

transmitting the first graphical token to a first person to be authorized to use the vehicle function;

sensing a second graphical token presented at the vehicle from the first person;

determining that an entropy of the graphical input exceeds a predetermined threshold; and enabling the vehicle function upon determining that the presented second graphical token matches the transmitted first graphical token;

wherein the graphical input comprises a further graphic, and an entropy of the further graphic exceeds the predetermined threshold.

2. The method according to claim 1, wherein the entropy takes into account an aspect of the graphical input that is not apparent from a graphical result.

3. The method according to claim 1, further comprising determining that the graphical input has a predetermined amount of information.

4. The method according to claim 1, wherein a predetermined condition is assigned to the first graphical token, and the vehicle function is enabled only if the condition is met.

5. The method according to claim 1, wherein the first graphical token comprises an indication of the vehicle function that is recognizable by a human.

6. The method according to claim 1, wherein the first graphical token comprises a predetermined background image.

7. The method according to claim 1, wherein:

the first graphical token is assigned an identifier;

the identifier is transmitted to the first person to be authorized;

the vehicle function is enabled only after the identifier is input; and media via which the first graphical token and the identifier are transmitted to the first person to be authorized are different from each other.

8. The method according to claim 7, wherein the identifier is transmitted acoustically.

* * * * *